United States Patent
Ramanath et al.

(10) Patent No.: US 9,507,616 B1
(45) Date of Patent: Nov. 29, 2016

(54) METHODS, SYSTEMS, AND COMPUTER READABLE MEDIA FOR EMULATING COMPUTER PROCESSING USAGE PATTERNS ON A VIRTUAL MACHINE

(71) Applicant: Ixia, Calabasas, CA (US)

(72) Inventors: Avinash Ramanath, Valencia, CA (US); Sergey Lvov, Woodland Hills, CA (US); Gheorghe Mihai Puchiu, Oxnard, CA (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/749,606

(22) Filed: Jun. 24, 2015

(51) Int. Cl.
G06F 9/46 (2006.01)
G06F 9/44 (2006.01)
G06F 9/455 (2006.01)
G06F 11/26 (2006.01)
G06F 11/36 (2006.01)

(52) U.S. Cl.
CPC ....... *G06F 9/45533* (2013.01); *G06F 9/45504* (2013.01); *G06F 11/261* (2013.01); *G06F 11/3664* (2013.01)

(58) Field of Classification Search
CPC ............. G06F 11/261; G06F 11/3664; G06F 9/45504
USPC ........................ 718/1; 717/134–135; 171/138
See application file for complete search history.

(56) References Cited

U.S. PATENT DOCUMENTS

| | | | |
|---|---|---|---|
| 6,542,854 B2 | 4/2003 | Yang et al. | |
| 6,769,054 B1 | 7/2004 | Sahin et al. | |
| 6,792,393 B1 | 9/2004 | Farel et al. | |
| 7,328,134 B1 | 2/2008 | Burbidge, III et al. | |
| 7,890,951 B2 | 2/2011 | Vinberg et al. | |
| 8,984,341 B1 | 3/2015 | Chandrasekharapuram et al. | |
| 9,317,252 B2 | 4/2016 | Roy et al. | |

(Continued)

FOREIGN PATENT DOCUMENTS

WO WO 2014/160660 A1 10/2014
WO WO 2015/023369 A1 2/2015

OTHER PUBLICATIONS

Final Office Action for U.S. Appl. No. 14/224,024 (Jun. 15, 2016).

(Continued)

*Primary Examiner* — Camquy Truong
(74) *Attorney, Agent, or Firm* — Jenkins, Wilson, Taylor & Hunt, P.A.

(57) ABSTRACT

According to one aspect, the disclosed subject matter describes herein a method for emulating computer processing usage patterns on a virtual machine that includes generating a usage pattern specification based on a plurality of computer processing usage patterns provided by a user and receiving, by a virtual machine hosted by a device under test (DUT), the usage pattern specification containing the plurality of computer processing usage patterns. The method also includes generating a plurality of pattern instruction sequences using execution parameters included in each of the plurality of computer processing usage patterns and distributing each of the plurality of pattern instruction sequences among a plurality of virtual processing cores of the virtual machine. The method further includes emulating the operation of the application on the virtual machine by executing the pattern instruction sequences on the virtual processing cores in a manner specified by the execution parameters.

20 Claims, 4 Drawing Sheets

(56) References Cited

U.S. PATENT DOCUMENTS

| | | |
|---|---|---|
| 2002/0087282 A1 | 7/2002 | Millard |
| 2002/0184614 A1 | 12/2002 | Davia et al. |
| 2003/0036897 A1 | 2/2003 | Flores et al. |
| 2003/0154432 A1 | 8/2003 | Scott et al. |
| 2003/0182408 A1 | 9/2003 | Hu |
| 2004/0015600 A1 | 1/2004 | Tiwary et al. |
| 2004/0139437 A1 | 7/2004 | Arndt |
| 2005/0216234 A1 | 9/2005 | Glas et al. |
| 2006/0025985 A1 | 2/2006 | Vinberg et al. |
| 2006/0037002 A1 | 2/2006 | Vinberg et al. |
| 2007/0067374 A1 | 3/2007 | Iketani et al. |
| 2007/0069005 A1 | 3/2007 | Dickerson et al. |
| 2007/0112549 A1 | 5/2007 | Lau et al. |
| 2008/0208554 A1 | 8/2008 | Igarashi |
| 2008/0221857 A1 | 9/2008 | Casotto |
| 2009/0089038 A1 | 4/2009 | Nadgir et al. |
| 2009/0259704 A1 | 10/2009 | Aharoni et al. |
| 2010/0111494 A1 | 5/2010 | Mazzaferri |
| 2010/0153529 A1 | 6/2010 | Moser |
| 2010/0161864 A1 | 6/2010 | Barde et al. |
| 2011/0066786 A1 | 3/2011 | Colbert |
| 2011/0246171 A1 | 10/2011 | Cleeton et al. |
| 2011/0307739 A1* | 12/2011 | El Mahdy ............. G06F 11/261 714/28 |
| 2012/0054740 A1 | 3/2012 | Chakraborty et al. |
| 2012/0060167 A1 | 3/2012 | Salsburg et al. |
| 2012/0192182 A1 | 7/2012 | Hayward et al. |
| 2012/0311387 A1 | 12/2012 | Santhosh et al. |
| 2013/0013657 A1 | 1/2013 | Emelko et al. |
| 2013/0055026 A1 | 2/2013 | Hatano et al. |
| 2013/0282354 A1 | 10/2013 | Sayers et al. |
| 2013/0297769 A1 | 11/2013 | Chang et al. |
| 2014/0006358 A1 | 1/2014 | Wang et al. |
| 2014/0013306 A1 | 1/2014 | Gounares et al. |
| 2014/0047272 A1 | 2/2014 | Breternitz et al. |
| 2014/0067940 A1 | 3/2014 | Li et al. |
| 2014/0068335 A1 | 3/2014 | Bromley et al. |
| 2014/0108001 A1 | 4/2014 | Brown et al. |
| 2014/0298335 A1 | 10/2014 | Regev et al. |
| 2014/0378057 A1 | 12/2014 | Ramon et al. |
| 2015/0046141 A1 | 2/2015 | Lahiri et al. |
| 2015/0120797 A1 | 4/2015 | Roy et al. |
| 2015/0135178 A1 | 5/2015 | Fischer et al. |
| 2015/0140956 A1 | 5/2015 | Prewitt, II et al. |
| 2015/0293826 A1 | 10/2015 | Sincan et al. |
| 2016/0034372 A1 | 2/2016 | Panda et al. |

OTHER PUBLICATIONS

Applicant-Initiated Interview Summary for U.S. Appl. No. 13/969,085 (Jun. 7, 2016).
Communication of European publication number and information on the application of Article 67(3) EPC for European Application No. 14836839.2 (May 25, 2016).
Applicant-Initialed Interview Summary for U.S. Appl. No. 14/224,024 (May 13, 2016).
Notice of Allowance and Fee(s) Due for U.S. Appl. No. 14/445,921 (May 12, 2016).
Final Office Action for U.S. Appl. No. 13/969,085 (Apr. 19, 2016).
Non-Final Office Action for U.S. Appl. No. 14/251,547 (Apr. 26, 2016).
Applicant-Initiated Interview Summary for U.S. Appl. No. 14/445,921 (Apr. 14, 2016).
Non-Final Office Action for U.S. Appl. No. 14/224,024 (Feb. 3, 2016).
Corrected Notice of Allowability for U.S. Appl. No. 14/158,659 (Jan. 11, 2016).
Notice of Allowance and Fee(s) Due for U.S. Appl. No. 14/158,659 (Dec. 11, 2015).
Non-Final Office Action for U.S. Appl. No. 14/445,921 (Jan. 14, 2016).
Non-Final Office Action for U.S. Appl. No. 13/969,085 (Sep. 24, 2015).
"Fisher-Yates Shuffle," http://en.wikipedia.org/wiki/Fisher-Yates_shuffle, pp. 1-11, (May 8, 2014).
"ImpairNetTM—EIM1G4S, EIM10G4S, and EIM40G2Q Ethernet Impairment Lead Module," pp. 1-5, (Jul. 2013).
"IxVM: Validating Virtualized Assets and Environments," Ixia, Data Sheet, pp. 1-8 (Jun. 2015).
Notification of Transmittal of the International Search Report and the Written Opnion of the International Searching Authority, or the Declaration for PCT International Application No. PCT/US2014/045658 (Oct. 30, 2014).
Notification of Transmittal of the International Search Report and the Written Opnion of the International Searching Authority, or the Declaration for PCT International Application No. PCT/US2014/031637 (Jul. 31, 2014).
"IxLoad: Specifications," https://web.archive.org/web/20130901094417/http://www.ixiacom.com/products/networktest/applications/ixload/specifications/index.php, pp. 1-5 (Sep. 1, 2013).
"IxLoad" Ixia, Solution Brief, pp. 1-4 (Feb. 2012).

* cited by examiner

METHODS, SYSTEMS, AND COMPUTER READABLE MEDIA FOR EMULATING COMPUTER PROCESSING USAGE PATTERNS ON A VIRTUAL MACHINE

TECHNICAL FIELD

The subject matter described herein relates to methods and devices used for testing virtual deployments. More particularly, the subject matter described herein relates to methods, systems, and computer readable media for emulating computer processing usage patterns on a virtual machine.

BACKGROUND

At present, numerous network elements and service nodes are being deployed in continuously expanding telecommunications networks by system administrators. In order to properly address the processing needs of a network by provisioning the optimal number or amount of resources, a system administrator typically requires knowledge of the processing capabilities of a network element in light of the likely demands it will be subjected to by network users. To obtain this pertinent information, a system administrator would ideally be able to simulate specific CPU and IO usage patterns on a virtual machine hosted by a network element in a testing environment. Notably, such specific simulations enable test managers to stress test a virtual machine setup in a device under test (DUT) and subsequently monitor and measure the resulting performance behavior.

Accordingly, there exists a need for methods, systems, and computer readable media for emulating computer processing usage patterns on a virtual machine.

SUMMARY

Methods, systems, and computer readable media for emulating computer processing usage patterns on a virtual machine are disclosed. According to one aspect, the subject matter described herein includes a method that generates a usage pattern specification based on a plurality of computer processing usage patterns provided by a user and receiving, by a virtual machine hosted by a device under test (DUT), the usage pattern specification containing the plurality of computer processing usage patterns, wherein each of the plurality of computer processing usage patterns includes execution parameters associated with the execution of simulated actions of an application. The method also includes generating a plurality of pattern instruction sequences using the execution parameters included in each of the plurality of computer processing usage patterns and distributing each of the plurality of pattern instruction sequences among a plurality of virtual processing cores of the virtual machine. The method further includes emulating the operation of the application on the virtual machine by executing the pattern instruction sequences on the virtual processing cores in a manner specified by the execution parameters.

The subject matter described herein may be implemented in hardware, software, firmware, or any combination thereof. As such, the terms "function" or "module" as used herein refer to hardware, which may also include software and/or firmware components, for implementing the feature being described (e.g., conducting simulations and emulations via executed software). In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for emulating computer processing usage patterns on a virtual machine. The present subject matter facilitates the simulation of computer processing usage patterns to follow user-defined application actions or activities. As used herein, a usage pattern may include a processing activity or load associated with the operation of an application or a combination of applications. Further, the usage pattern can represent the activity generated by a single user or multiple users (e.g., multiple and contemporaneous instances of bank account access). In some embodiments, the subject matter simulates the CPU usage by performing the actions specified in user-defined usage patterns, such as pre-canned simulation usage patterns or by customized usage patterns. In some embodiments, the present subject matter provisions pre-canned CPU usage patterns for specific actions. Notably, the disclosed subject matter affords a user the ability to define a specific pattern of computer processing usage that can be used in a test tool environment to generate CPU consumption, file input/output (I/O) access (e.g., non-cache storage access, disk access, etc.), and/or memory usage (e.g., RAM consumption, cache utilization, processor cache consumption, and the like). The predefined levels of generated computer processing usage (e.g., CPU consumption, file I/O access, and/or memory usage) may therefore be used to validate the CPU management solution being employed by a physical device and/or virtual machine being tested.

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
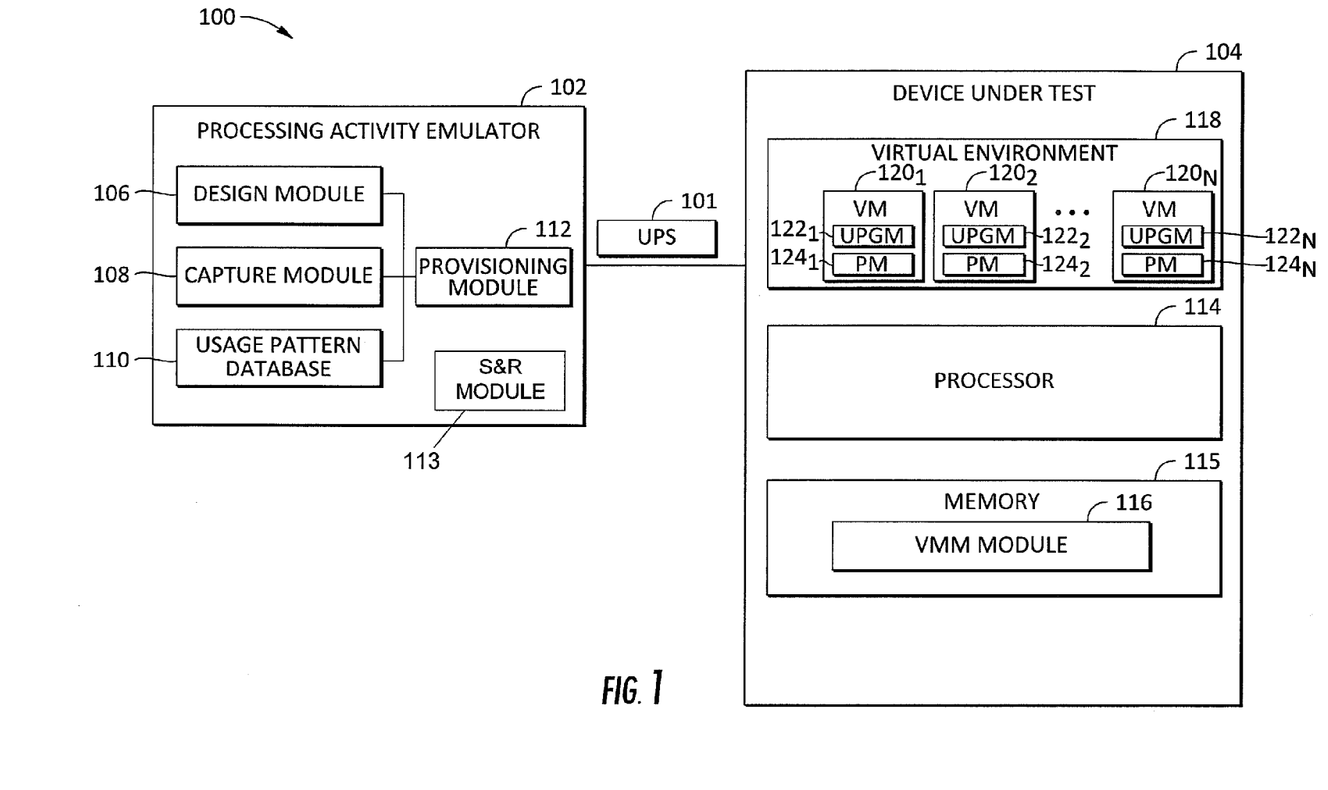
FIG. 1 is a diagram illustrating an exemplary system for emulating computer processing usage patterns on a virtual machine according to an embodiment of the subject matter described herein.

FIG. 1 is a diagram illustrating a test system 100 that includes a processing activity emulator 102 (e.g., a processing activity emulation machine) and a device under test (DUT) 104. Processing activity emulator 102 can be communicatively connected to DUT 104 via a wired or wireless connection. In some embodiments, processing activity emulator 102 may include a design module 106, a capture module 108, a usage pattern database 110, a provisioning module 112, and a statistics and reporting module 113. As used herein, each of modules 106, 108, 112, and 113 may comprise a software based program that is executed by a processor (not shown) in emulator 102. Usage pattern database 110 can comprise any storage unit or memory structure configured to store data.

In some examples, design module 106 can be utilized by a user (e.g., a system administrator, network manager, test administrator, etc.) to create and/or construct computer processing usage patterns that emulates a user-defined pattern of user interaction associated with the execution of a software application (e.g., user activity corresponding to the operation of word processing application). In some embodiments, design module 106 enables a user to specify certain parameters and/or values that are to be included in the customized specification. For example, design module 106 may comprise a module configured to receive input and/or specifications from a user via a user interface. Specifically, design module 106 may be used to customize a computer processing usage pattern specification that specifies the individual activities, inputs, and/or commands a software application may experience under the operation of a user. In some embodiments, a user may initially select the executable actions of the application operation that need to be emulated on a device (e.g., a DUT) and/or associated virtual machines to be tested. Exemplary user actions may include the launching/opening the application, the closing of the application, the operation of the application, and the like). Examples of applications in this context may include a word processing application, a media player application, a spreadsheet application, web browsing application, and the like. In some embodiments, user-defined activities and actions may be represented in a graphical manner (as opposed to a task-based manner). For instance, the user-defined activities may include a timeline that defines and/or specifies different usage patterns of activity, such as a ramp-up of processing activity, a ramp-down of processing activity, a Poisson distribution pattern of processing activity, and the like.

In addition to specifying the actions to be emulated, the user may subsequently select associated execution parameters (e.g., number of cores to run the application, etc.) that will be applied to the specified actions of the user-defined computer processing usage pattern. In some instances, the execution parameters operate to establish and/or provide the rules for the execution of the selected actions on the DUT. For example, a user may utilize design module 106 (e.g., via a GUI or command line interface) to specify a number of execution parameters, such as i) a computer processing usage pattern count, ii) an amount of total time for executing the patterns, iii) a designation as to whether the patterns are to be executed serially or in parallel, iv) a designation as to whether the patterns should load processing cores in an evenly distributed manner, and the like. In addition to these 'global' input execution parameters, each of the patterns may further include pattern-specific execution parameters, including i) a specified thread count for executing the computer processing usage pattern, ii) the number of cores to use to execute the computer processing usage pattern, iii) an indication (e.g., a flag, a bit indicator, etc.) whether to automatically scale the computer processing usage pattern to run on all of the virtual processing cores, iv) a number of instances (e.g., "P" times) to repeat the execution of the computer processing usage pattern, and/or v) the total time (e.g., a timeline and/or a time limit duration) to execute the computer processing usage pattern. In some embodiments, the execution parameters may further include a central processing unit (CPU) usage threshold limit, a file I/O access threshold limit, and/or a memory usage threshold limit to be adhered to in the simulation testing. Notably, each of these threshold limits may include a minimum threshold limit and/or a maximum threshold limit.

After the actions/activities and associated execution parameters are designated by the user as described above, design module 106 may generate a computer processing usage pattern specification, such as a CPU usage pattern specification, a file I/O access pattern specification, and/or a memory usage pattern specification. Notably, design module 106 may combine or aggregate the designated actions and execution parameters to form a CPU usage pattern specification, which may be embodied as a software based package or object comprising XML data, binary data, or file data.

After being created by design module 106, the usage pattern specification may be forwarded to provisioning module 112 by design module 106 for delivery to DUT 104. Alternatively, the usage pattern specification may be stored in usage pattern database 110 by design module 106 via provisioning module 112 for future test use and/or DUT provisioning.

As indicated above, processing activity emulator 102 further includes capture module 108. In some examples, capture module 108 can include any software entity that is configured to monitor and record actual CPU usage patterns being executed by a deployed computing device and/or network element. For example, capture module 108 may comprise a utility software element that is executed by at least one processor of emulator 102 and that provides diagnostic tools for monitoring interactions (such as system calls, signal deliveries, changes in process state, etc.) between the simulated application processes and the processor. In other embodiments, capture module 108 includes a diagnostic software tool that monitors and records system calls. After capture module 108 records a plurality of the observed system calls and/or signal deliveries, capture module 108 may forward the recorded information to design module 106 (e.g., via an application programming interface (API)). Design module 106 can then process the information received from capture module 108 to generate one or more usage pattern specifications.

In some embodiments, usage pattern database 110 may comprise any data storage device configured to store a plurality of defined and/or customized-usage pattern specifications. The usage pattern specifications stored in database 110 may be a customized usage pattern specification generated by design module 106 or a usage pattern specification based on data captured by capture module 108. Moreover, usage pattern database 110 may also be configured to receive and store pre-canned CPU usage patterns generated and/or designed by a separate system. In some embodiments, provisioning module 112 may be configured to access database 110 per a user's direction or via a system call in order to obtain a stored usage pattern specification for delivery to and provisioning on DUT 104.

As shown in FIG. 1, processing activity emulator 102 may include a statistics and reporting module 113. In some embodiments, statistics and reporting module 113 is configured to generate reports the statistics and test status to the users of the system (e.g., via messages and/or a graphical user interface (GUI) display).

In some embodiments, DUT 104 can comprise a processor 114 and memory 115. Memory 115 may include a virtual machine monitoring (VMM) module 116 that, when executed by processor 114, establishes a virtual environment 118 on DUT 104. In some embodiments, VMM module 116 may comprise a hypervisor or other software application that is configured to manage and support a virtual environment 118 that includes a plurality of virtual machines $120_{1 \ldots N}$ (or virtual ports). Within each virtual machine or port, there is an ability to specify the pattern as an input. As described below, each virtual machine has a pattern generation module 122 that understands the input and generates the pattern. For example, each of virtual machines $120_{1 \ldots N}$ depicted in FIG. 1 may include a usage pattern generation module 122 along with a publisher module 124. Virtual environment 118 may be further supported by the underlying hardware components (e.g., processor 114, memory 115, and data storage elements) residing on DUT 104.

In some embodiments, usage pattern generation module 122 includes a software module that can be configured to receive a usage pattern specification as input from emulator 102. The functionality of usage pattern generation module 122 is discussed in greater detail below with regard to FIG. 2 (e.g., usage pattern generation module 222).

Figure 2:
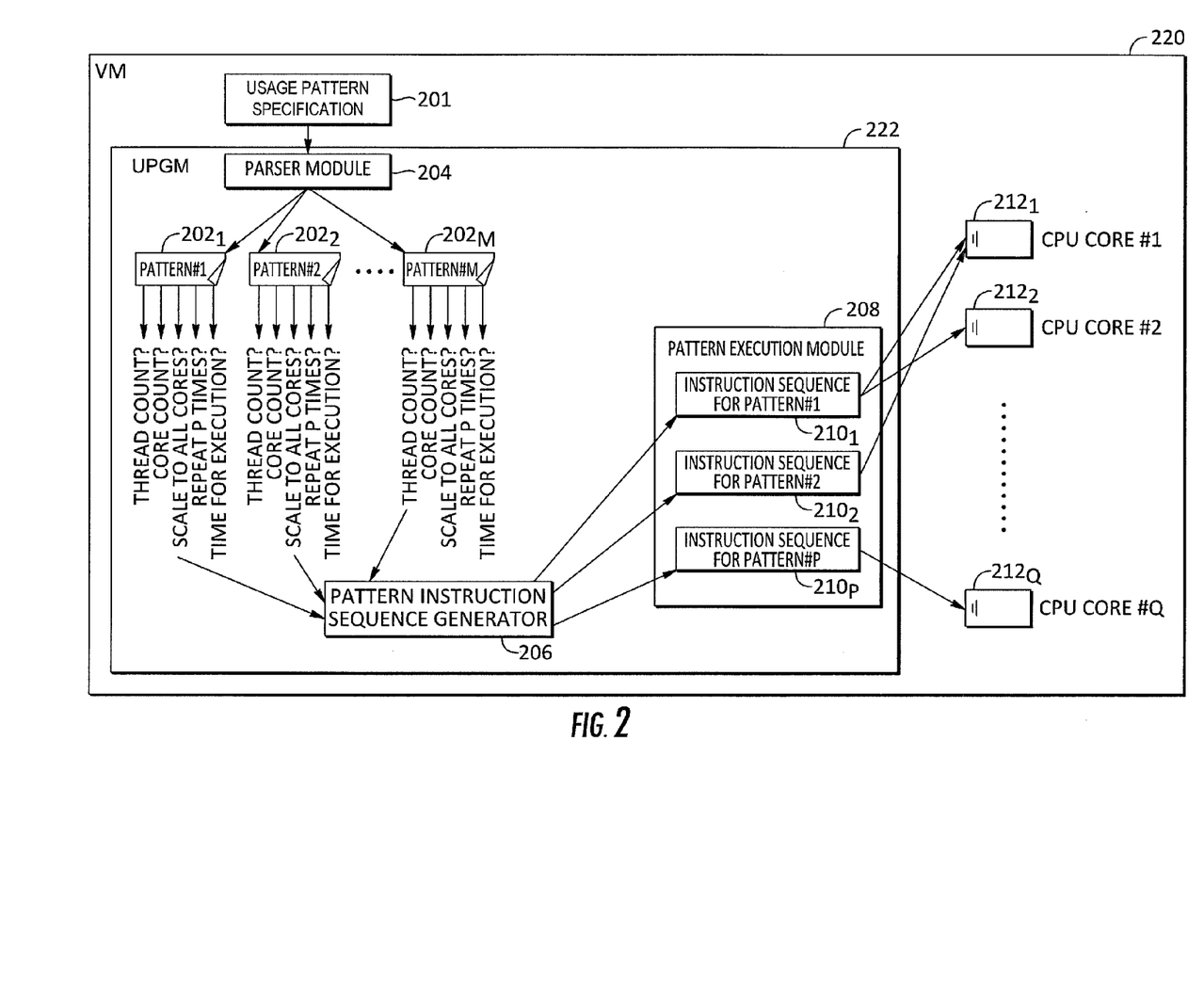
FIG. 2 is a block diagram illustrating an exemplary virtual machine configured for emulating computer processing usage patterns according to an embodiment of the subject matter described herein.

In some embodiments, publishing module 124 may include a software module that is configured to monitor CPU usage across multiple processing cores (e.g., cores 212 in FIG. 2). Publishing module 124 further reports the execution status information to a test manager via processing activity emulator 102. In some embodiments, emulator 102 may be configured to aggregate execution status information received from multiple virtual machines (e.g., virtual machines $120_{1 \ldots N}$) and display the processing statistics to a test manager or other user. Notably, the publishing of the pattern and associated processing statistics is used to confirm that the performance the virtual machine is exhibiting from the hypervisor is real/accurate.

FIG. 2 is a block diagram illustrating an exemplary virtual machine configured for emulating computer processing usage patterns according to an embodiment of the subject matter described herein. For example, virtual machine 220 may comprise a usage pattern generation module (UPGM) 222 and a plurality of virtual processor cores, such as virtual CPU cores 212. UPGM 222 may further include a parser module 204, a pattern instruction sequence generation module 206, a pattern execution module 208, each of which are described in greater detail below.

In some embodiments, parser module 204 in UPGM 222 receives a CPU usage pattern specification 201 for processing. For example, parser module 204 may be configured to extract one or more patterns from the received usage pattern specification 201. Moreover, parser module 204 may further extract pattern parameters from each of the patterns and convert each of the execution patterns into a machine compatible format. For example, parser module 204 may convert the execution parameters into an XML file. Likewise, FIG. 2 illustrates that execution parameters data specifying i) a thread count, ii) a processing core count, iii) scalability to all cores, iv) a number of times to repeat, and v) an execution time is obtained from each of the patterns to be processed (e.g., patterns $202_{1 \ldots M}$). After the translation by parser module 204, the aforementioned pattern parameters can be forwarded to pattern instruction sequence generation module 206 where the parameters are collected and aggregated. In some embodiments, pattern instruction sequence generation module 206 receives individual CPU usage pattern information. In some embodiments, pattern instruction sequence generation module 206 may be configured to further receive global CPU usage pattern information as input from parser module 204. Notably, global CPU usage pattern information includes an aggregation of the individual CPU usage pattern information provided by parser module 204.

Upon receiving the execution parameters included in usage patterns 202, pattern instruction sequence generation module 206 may generate a unique instruction sequence for each of the plurality of usage patterns. As used herein, an exemplary instruction sequence may include a software program and/or object. For example, the instruction sequence may be embodied in an XML format, a binary format, JavaScript Object Notation (JSON) format, or as file data. Once generated by pattern instruction sequence generation module 206, the instruction sequences are forwarded to pattern execution module 208 as input. For example, FIG. 2 depicts instruction sequences $210_{1 \ldots P}$ being utilized (e.g., accessed from memory or a database) by pattern execution module 208 for processing and/or distribution. Pattern execution module 208 is configured to execute the rules established by the instruction sequences and serves as an aggregator for all the instruction sequences. Notably, pattern execution module 208 generates an execution sequence for each of the pattern instruction sequences to be processed and/or translated by pattern execution module 208. In some examples, the execution sequences may be represented as a timeline to be simulated by one or more of the virtual cores.

In some embodiments, pattern execution module 208 initiates the distribution and/or loading of the instruction sequences among virtual processing cores $212_{1 \ldots Q}$ of virtual machine 222 for execution (of a CPU usage simulation). For example, pattern execution module 208 may implement a round-robin distribution of instruction sequences 210 across virtual processing cores $212_{1 \ldots Q}$. Each of virtual processing cores $212_{1 \ldots Q}$ subsequently executes instruction sequences 210, which in turn simulates CPU usage as originally defined by the user. For example, the CPU usage may be defined via the pre-canned simulation patterns and/or the custom defined patterns managed by a processing activity emulator (e.g., processing activity emulator 102).

By provisioning the instruction sequences across virtual processing cores $212_{1 \ldots Q}$, the selected CPU usage patterns are being emulated on a virtual machine 220 of the DUT. Such a simulation test affords a user the ability to control CPU usage and correlate it to underlying system comprising hardware and/or hypervisor to determine if the system is performing correctly. Notably, the simulation of multiple users utilizing multiple applications based on the number of instruction sequences are being generated and applied to processing cores $212_{1 \ldots Q}$. In some embodiments, the disclosed subject matter is configured to allow a user to simulate multiple CPU usage patterns via profiles (e.g., pre-canned CPU usage patterns) across multiple servers and to monitor the performance.

After the pattern instruction sequences are executed by the virtual processing cores 212, pattern execution module 208 can generate an electronic status report that indicates the state and/or status of execution for all of the executed pattern instruction sequences 208. Notably, pattern execution module 208 may be configured to assess the status of the executed pattern instruction sequence and send the electronic status report reflecting such stats to statistics and reporting module 113 (shown in FIG. 1). Publisher module 124 may then provide and/or present the collected status information in a visual manner, such as via a graphical user interface (GUI) or a printed report.

Figure 3:
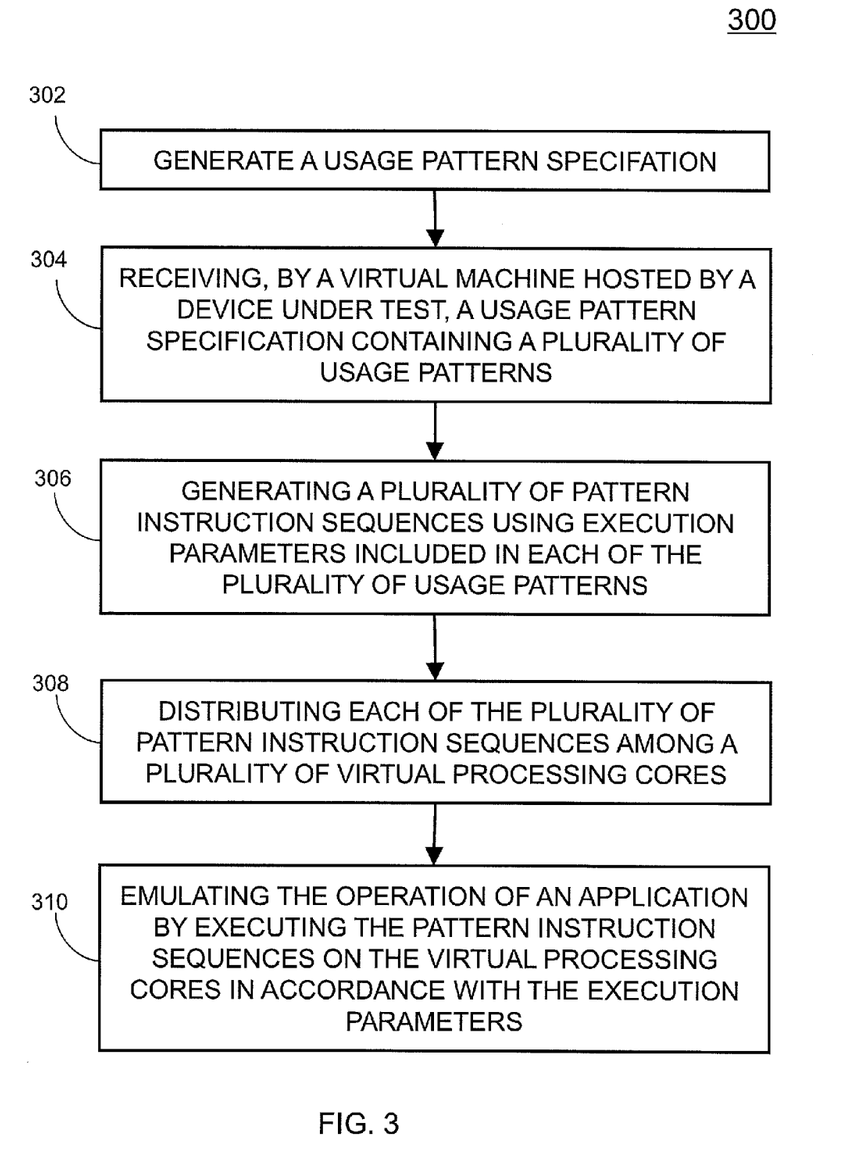
FIG. 3 is a flow chart illustrating an exemplary process for emulating computer processing usage patterns on a virtual machine in a virtual environment according to an embodiment of the subject matter described herein.

FIG. 3 is a flow chart illustrating an exemplary method 300 for emulating computer processing usage patterns (e.g., CPU usage patterns) on a virtual machine according to an embodiment of the subject matter described herein. In step 302, a usage pattern specification is generated. Initially, a test system administrator or another user first customizes and/or define a computer processing usage pattern, such as a CPU usage pattern, that is to be included in the usage pattern specification to be generated. In some embodiments, the CPU usage pattern may be based on CPU usage measurements taken or captured by specific applications installed on the virtual environment. For example, the application may include a diagnostic utility application that monitors and records interactions between executed processes and the processing kernel. Such interactions include system calls, signal deliveries, and changes of process states. Similarly, the CPU usage may be recorded based on the reading, writing, and updating of specific files for specific applications. For example, operations related to file I/O and memory utilization can be captured and replayed in conjunction with the simulation of CPU usage patterns. In some instances the CPU usage pattern may be defined or customized by a user as a graphical representation of processing activity over a period of time. For example, a user may define a CPU usage pattern to include the ramping up, ramping down, and/or a steady state of processing activity displayed on a time line.

After one or more CPU usage patterns is defined by the user as described above, a design module in the processing activity emulator may generate one or more usage pattern specifications by aggregating the CPU usage patterns into one or more usage pattern specifications. The design module may also be configured to forward the generated usage pattern specifications to a provisioning module in the processing activity emulator for distribution.

In step 304, a computer processing usage pattern specification containing a plurality of usage patterns is received. In some embodiments, a virtual machine hosted by a DUT receives a computer processing usage pattern specification, such as a CPU usage pattern specification, from the processing activity emulator (via the provisioning module). The usage pattern specification may comprise a CPU usage pattern specification including one or more CPU usage patterns that i) were customized by a user and/or ii) were predefined CPU usage patterns (e.g., as described in step 302). In some embodiments, a parser module in the virtual machine receives the CPU usage pattern specification and extracts the CPU usage patterns to conduct a translation process (e.g., convert the patterns included CPU usage pattern specification to a format that is comprehended by the pattern instruction sequence generator).

In step 306, a plurality of pattern instruction sequences using execution parameters included in each of the plurality of CPU usage patterns is generated. In some embodiments, the pattern instruction sequence generation module in the virtual machine processes the extracted execution parameters, and subsequently generates a pattern instruction sequence for each respective usage pattern (containing said execution parameters). After being generated, the pattern instruction sequences are sent to a pattern execution module residing in the virtual machine.

In step 308, the pattern instruction sequences are distributed. In some embodiments, the pattern execution module is configured to distribute the pattern instruction sequences among a plurality of virtual processing cores (e.g., virtual CPU cores) utilized by the virtual machine. For example, the pattern execution may distribute the pattern instruction sequences among the virtual processing cores in a round-robin fashion, or in accordance with some performance based or load based parameters.

In step 310, the operation of the application is emulated on the virtual machine. In some embodiments, the operation of the application is emulated by executing the pattern instruction sequences on the virtual processing cores in a manner specified by the execution parameters. Further, the performance of each of the virtual processing cores conducting the simulation may be monitored or measured by the statistics and reporting module 113.

Figure 4:
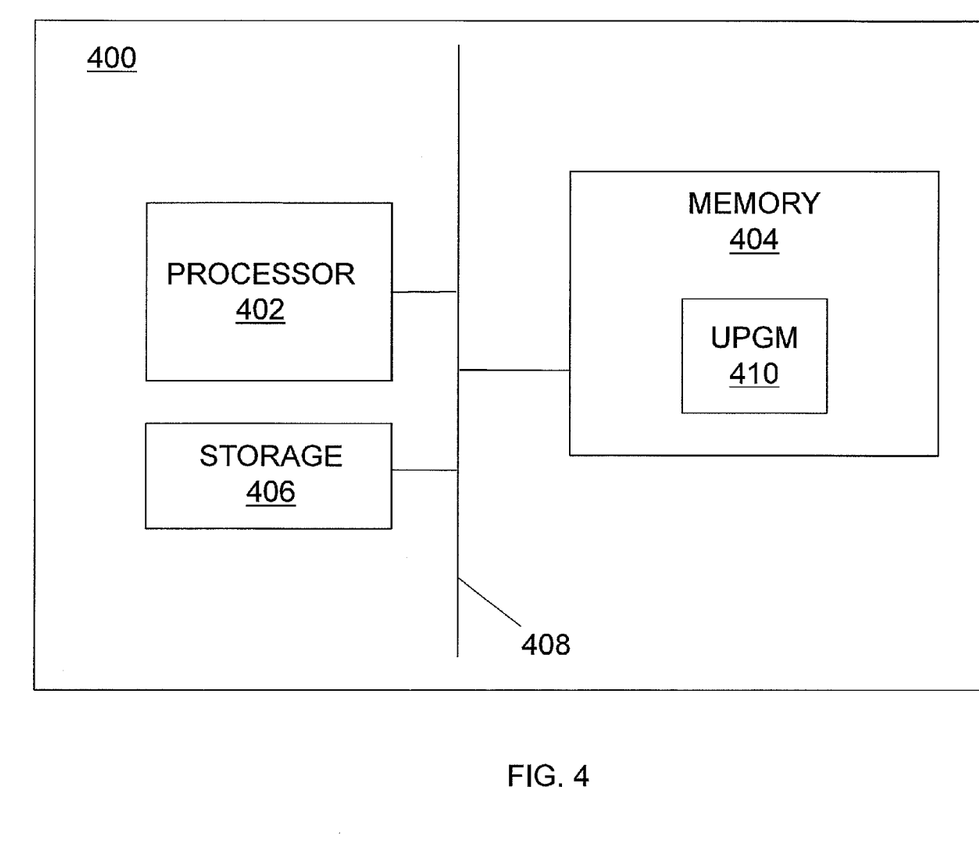
FIG. 4 is a block diagram of a special purpose computer system suitable for use in performing the functions described herein.

FIG. 4 depicts a high level block diagram of a special purpose computer system suitable for use in performing the functions described herein. As depicted in FIG. 4, system 400 comprises a processor 402, a memory 404, a storage device 406, and communicatively connected via a system bus 408. In some embodiments, processor 402 can comprise can comprise a microprocessor, central processing unit (CPU), or any other like hardware based processing unit. In some embodiments, a usage pattern generation module (UPGM) 410 can be stored in memory 404, which can comprise random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation of UPGM 410. In some embodiments, storage device 406 can comprise any storage medium or storage unit that is configured to store data accessible by processor 402 via system bus 408. Exemplary storage devices can comprise one or more local databases hosted by system 400. In some embodiments, each of processor 402, memory 404, storage device 406 may comprise hardware elements of an underlying special purpose machine that supports the execution of UPGM 410 in a virtual machine and/or virtual environment.

It should be noted that processing activity emulator 102, DUT 104, and/or functionality described herein (e.g., see FIG. 1) can constitute a special purpose computing system. Further, processing activity emulator 102, DUT 104, and/or functionality described herein can improve the technological field of simulation testing by emulating CPU usage patterns to follow predefined and/or customized user-defined activities or actions, thereby facilitating reliable stress tests in virtual machine environments and subsequently observing the behavior exhibited by individual virtual machines in the virtual machine environment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for emulating computer processing usage patterns on a virtual machine, the method comprising:
   generating a usage pattern specification based on a plurality of computer processing usage patterns provided by a user;

receiving, by a virtual machine hosted by a device under test (DUT), the usage pattern specification containing the plurality of computer processing usage patterns, wherein each of the plurality of computer processing usage patterns includes execution parameters associated with the execution of simulated actions of an application;

generating a plurality of pattern instruction sequences using the execution parameters included in each of the plurality of computer processing usage patterns;

distributing each of the plurality of pattern instruction sequences among a plurality of virtual processing cores of the virtual machine; and emulating the operation of the application on the virtual machine by executing the pattern instruction sequences on the virtual processing cores in a manner specified by the execution parameters.

2. The method of claim 1 wherein the user selects one or more of the plurality of computer processing usage patterns from a plurality of stored pre-defined usage patterns.

3. The method of claim 1 wherein the user defines one or more of the plurality of computer processing usage patterns to generate a customized computer processing usage pattern.

4. The method of claim 1 wherein each of the plurality of computer processing usage patterns specifies actions executed by the application in response to user activity.

5. The method of claim 1 further comprising measuring a performance level of i) each of the virtual cores, ii) file input/output access, or iii) memory usage emulating the operation of the application.

6. The method of claim 1 wherein the execution parameters corresponding to each computer processing usage pattern includes at least one of i) a specified thread count for executing the computer processing usage pattern, ii) a number of processing cores to use to execute the computer processing usage pattern, iii) an indication whether to automatically scale the computer processing usage pattern to run on all of the virtual processing cores, iv) a number of instances to repeat the execution of the computer processing usage pattern, and v) a total amount of time to execute the computer processing usage pattern.

7. The method of claim 1 wherein the pattern instruction sequence specifies computer processing usage patterns representing activity generated by multiple pre-canned usage patterns operating across multiple servers.

8. A system for emulating computer processing usage patterns on a virtual machine, the system comprising:

a processing activity emulation machine configured to generate a computer processing usage specification based on a plurality of computer processing usage patterns provided by a user;

a device under test (DUT) that includes:
one or more virtual machines hosted by the DUT configured to receive the usage pattern specification containing the plurality of computer processing usage patterns, wherein each of the one or more virtual machines includes a usage pattern generation module comprising:

a pattern instruction sequence generation module configured to receive the usage pattern specification containing the plurality of computer processing usage patterns and to generate a plurality of pattern instruction sequences using execution parameters included in each of the plurality of computer processing usage patterns, wherein each of the plurality of computer processing usage patterns includes the execution parameters associated with the execution of simulated actions of an application; and a pattern execution module configured to receive the plurality of pattern instruction sequences, to distribute each of the plurality of pattern instruction sequences among a plurality of virtual processing cores of the virtual machine, wherein the operation of the application is emulated on the virtual machine via the execution of the pattern instruction sequences on the virtual processing cores in a manner specified by the execution parameters.

9. The system of claim 8 wherein the user selects one or more of the plurality of computer processing usage patterns from a plurality of stored pre-defined usage patterns.

10. The system of claim 8 wherein the user defines one or more of the plurality of computer processing usage patterns to generate a customized computer processing usage pattern.

11. The system of claim 8 wherein each of the plurality of computer processing usage patterns specifies actions executed by the application in response to user activity.

12. The system of claim 8 wherein the processing activity emulator is further configured to measure a performance level of i) each of the virtual cores, ii) file input/output access, or iii) memory usage emulating the operation of the application.

13. The system of claim 8 wherein the execution parameters corresponding to each computer processing usage pattern includes at least one of i) a specified thread count for executing the computer processing usage pattern, ii) a number of processing cores to use to execute the computer processing usage pattern, iii) an indication whether to automatically scale the computer processing usage pattern to run on all of the virtual processing cores, iv) a number of instances to repeat the execution of the computer processing usage pattern, and v) a total amount of time to execute the computer processing usage pattern.

14. The system of claim 8 wherein the pattern instruction sequence specifies computer processing usage patterns representing activity generated by multiple pre-canned usage patterns operating across multiple servers.

15. A non-transitory computer readable medium having stored thereon executable instructions that when executed by the processor of a computer cause the computer to perform steps comprising:

generating a usage pattern specification based on a plurality of computer processing usage patterns defined by a user;

receiving, by a virtual machine hosted by a device under test (DUT), the usage pattern specification containing the plurality of computer processing usage patterns, wherein each of the plurality of computer processing usage patterns includes execution parameters associated with the execution of simulated actions of an application;

generating a plurality of pattern instruction sequences using the execution parameters included in each of the plurality of computer processing usage patterns;

distributing each of the plurality of pattern instruction sequences among a plurality of virtual processing cores of the virtual machine; and emulating the operation of the application on the virtual machine by executing the pattern instruction sequences on the virtual processing cores in a manner specified by the execution parameters.

16. The computer readable medium of claim 15 wherein the user selects one or more of the plurality of computer processing usage patterns from a plurality of stored predefined usage patterns.

17. The computer readable medium of claim 15 wherein the user defines one or more of the plurality of computer processing usage patterns to generate a customized computer processing usage pattern.

18. The computer readable medium of claim 15 wherein each of the plurality of computer processing usage patterns specifies actions executed by the application in response to user activity.

19. The computer readable medium of claim 15 further comprising measuring a performance level of i) each of the virtual cores, ii) file input/output access, or iii) memory usage emulating the operation of the application.

20. The computer readable medium of claim 15 wherein the pattern instruction sequence specifies computer processing usage patterns representing activity generated by pre-canned usage patterns profiles operating across multiple servers.

* * * * *